United States Patent Office 2,862,952
Patented Dec. 2, 1958

2,862,952

METHOD OF PREPARING B-HYDROCARBON-SUBSTITUTED BORON COMPOUNDS

Stephen J. Groszos, Darien, Conn., assignor to American Cyanamid Company, New York, N. Y., a corporation of Maine No Drawing. Application August 26, 1957
Serial No. 680,394

10 Claims. (Cl. 260—462)

This invention relates to a method of preparing B-hydrocarbon-substituted boron compounds. More particularly, the invention is concerned with certain new and useful improvements in a method of making such compounds by reacting an ester of an oxy acid of boron with a hydrocarbon halide while the reactants are in intimate contact with metallic magnesium. The ester of the oxy acid of boron (i. e., the starting ester reactant) is one in which the ester component thereof is represented by —(OR)$_n$ wherein R represents a hydrocarbon radical and $n$ represents an integer from 1 to 3, inclusive. The scope of the invention also includes the additional steps, if desired, of hydrolyzing, preferably under acidic conditions, the product obtained from the first reaction and isolating the hydrolyzed product as such or as an isolable derivative thereof. The hydrolysis product comprises a hydrocarbon-substituted boronic acid or a borinic acid when the starting ester reactant is, respectively, a borate or a hydrocarbon-substituted boronate.

The prior methods of preparing, for instance, boronic acids have generally involved an organo-metallic compound as one of the reactants and a boron trihalide or a trialkyl borate as a second reactant. Thus, Krause and Nitsche [Ber., 51, 2784 (1921); and Ber., 55, 1261 (1922)] used the technique represented by the following simplified equation:

I

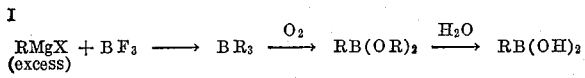

Numerous other investigators [e. g., Khotinsky and Melamed, Ber., 42, 3090 (1909] have prepared boronic acids by the addition of an ether solution of a trialkyl borate to an ether solution of a Grignard reagent maintained at about —70° C., as represented by the following simplified equation:

II

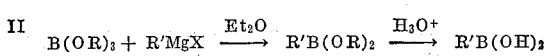

Hydrolysis of the boronic ester, preferably under acidic conditions as indicated in the equation, liberates the free acid. (In Equation II and in other equations herein the symbol H$_3$O$^+$ means acidic water, which can also be represented by H$^+$,H$_2$O.)

The methods represented by Equations I and II each have the disadvantage of requiring the separate step of preparing a Grignard reagent (or a lithium reagent which also has been employed in the prior art instead of a Grignard reagent). Additionally, the manipulation (as in the method of Equation I) of water-sensitive gaseous reactants, such as BF$_3$, is frequently troublesome, and this is particularly true when the reaction is carried out on a small scale. Furthermore, there are the inherent disadvantages in both methods of using diethyl ether or other liquid medium in which the reaction between the primary reactants is effected. The use of a large volume of a liquid reaction medium is uneconomical from the standpoint of large volume of reactor space that is required; and, for this reason, is generally unsatisfactory for large-scale syntheses from a cost and design standpoint.

It is a primary object of the present invention to provide an improved method of preparing certain B-hydrocarbon-substituted boron compounds, hereafter more fully described, which method obviates the above-mentioned disadvantages of the prior-art methods, namely: eliminates the necessity for the separate preparation of a Grignard reagent and the use of ether (diethyl ether) or other solvent as a liquid medium in which the reaction is effected.

Another object of the invention is to provide an improved method of preparing certain compounds of boron which requires less reactor space than the prior-art processes and, also, is more suitable for large-scale syntheses and makes it possible to produce the compound in a shorter period of time than the prior methods.

Other objects of the invention will be apparent to those skilled in the art from the following more detailed description of the invention.

The objects of the invention are attained by reacting (1) an ester of an oxy acid of boron of the kind set forth in the first paragraph of this specification with (2) a hydrocarbon halide, more particularly, a hydrocarbon chloride, bromide or iodide, while the said reactants are intimately associated with metallic magnesium, for instance, in the form of filings, turnings, shots or pellets, etc. Advantageously, the magnesium is suitably pretreated prior to use in order to cleanse its surfaces. For example, the pretreatment may take the form of etching with an aqueous solution of a strong mineral acid, e. g., hydrochloric acid, hydrobromic acid, sulfuric acid, phosphoric acid, etc., followed by washing to remove the acid, and then drying. Other means of etching or of otherwise activating the magnesium may be employed. For example, the magnesium may be activated by treatment with iodine or by other means briefly described in Kharasch and Reinmuth's "Grignard Reactions of Nonmetallic Substances," pp. 8–15, Prentice-Hall, Inc., New York, 1954, and in the original references cited therein.

When the starting boron reactant is a boron triester, the reaction may be illustrated by the following simplified equation:

III

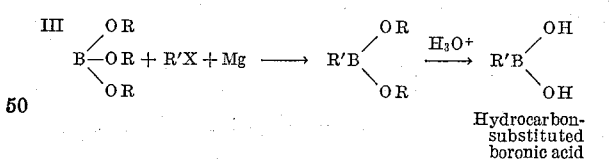

Hydrocarbon-substituted boronic acid

When the starting boron reactant is a boron diester, the reaction may be illustrated by the following simplified equation:

IV

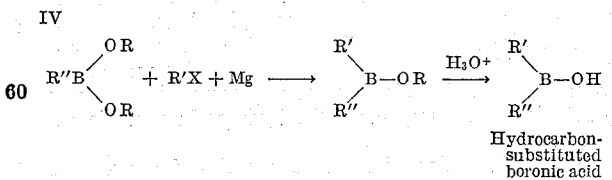

Hydrocarbon-substituted boronic acid

The hydrocarbon-substituted borinic acid can be dehydrated, by heating, to yield the corresponding boronic anhydride, thus:

V

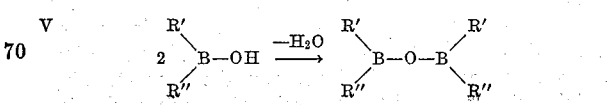

When the starting boron reactant is a boron monoester, the reaction may be illustrated by the following simplified equation:

VI 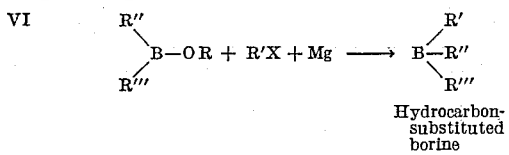

Hydrocarbon-substituted borine

In the above equations (including Equations I and II) R, R', R" and R'" each represents a hydrocarbon radical and they may be the same or different.

Illustrative examples of hydrocarbon radicals represented by R, R', R" and R'" where they appear in Equations III, IV, V and VI are alkyl (including cycloalkyl), alkenyl (including cycloalkenyl), aralkyl, aralkenyl, aryl, alkaryl and alkenylaryl. More specific examples of such radicals are methyl, ethyl, propyl, isopropyl, butyl, isobutyl, sec.-butyl, amyl, isoamyl, hexyl to octadecyl, inclusive (both normal and isomeric forms), cyclopentyl, cyclopentenyl, cyclohexyl, cyclohexenyl, cycloheptyl, etc.; benzyl, phenylethyl, phenylpropyl, phenylisopropyl, phenylallyl, etc.; phenyl, biphenylyl or xenyl, naphthyl, etc.; tolyl, xylyl, ethylphenyl, propylphenyl, isopropylphenyl, butylphenyl, allylphenyl, etc.; and vinyl, allyl, methallyl, propenyl, isopropenyl ($\beta$-allyl), 1-butenyl, 2-butenyl (crotyl), 3-butenyl, pentenyl, hexenyl, butadienyl, etc. It will be noted that all of the foregoing examples of hydrocarbon radicals are those wherein any unsaturation between adjacent carbon atoms is a double bond. In the formula R'X appearing in Equations III, IV and VI, X represents a halogen selected from the class consisting of chlorine, bromine and iodine.

In carrying the present invention into effect the hydrocarbon halide and metallic magnesium can be employed in stoichiometric proportions, or with the one or the other in excess, e. g., from 1 to 100 percent of the one in excess over stoichiometric proportions with respect to the other. The ratio of boron ester to hydrocarbon halide employed is in equimolar (equimolecular) or, preferably, in excess of equimolar proportions, e. g., from about 10 mole percent to about 1500 mole percent in excess of equimolar proportions. The excess to which reference is made in the preceding sentence can be achieved in, for example, two ways. Where the hydrocarbon halide and magnesium are in equimolar (equimolecular) amounts, the boron triester can be present in the molar ratios set forth in the second sentence of this paragraph. On the other hand, if the hydrocarbon halide and the said boron triester are present in equimolar ratio, the magnesium can be present in less than equimolar ratio as compared with the hydrocarbon halide.

The excess boron ester functions primarily as a reaction medium (generally a liquid at the temperature of the reaction) in which the reaction between the primary reactants is effected, and thus aids in controlling the reaction. The boiling point of the particular boron ester employed and the rate of addition of the hydrocarbon halide are each helpful in controlling the rate of reflux and/or the reaction temperature. Good results have been obtained, preferably in producing a boronate or a boronic acid, by using the boron-ester starting reactant in from 300 to 600 mole percent in excess of equimolar proportions with respect to the hydrocarbon halide reactant.

Within the ratios of reactants mentioned above, one also can control to some degree the proportions of predominating reaction products in the reaction mass. Thus, starting with a triester of boric acid and, when one desires to obtain mainly a boronate (or the corresponding boronic acid), one can use the said triester in a relatively large molar excess (e. g., from 10 to 100 mole percent in excess) over the hydrocarbon halide. If one desires to produce mainly a borinate (or the corresponding borinic acid), one can use the said triester in equimolar or only a slightly molar excess (e. g., from 0.1 to 9.9 mole percent in excess) over the hydrocarbon halide. And if one desires to obtain mainly a borine, one can use the hydrocarbon halide in equimolar or in molar excess with respect to the boron triester but greater than equimolar proportions with respect to the magnesium.

The reaction between the primary reactants is effected at a temperature of from about 100° C. up to a temperature corresponding to the reflux temperature of the reaction mass. In general, the temperature above about 100° C. at which the reaction is effected is governed primarily by the boiling point of the mixture of organic reactants. When this temperature is below about 100° C., e. g., when the boron ester is trimethyl borate (B. P., 67°–69° C.), the reaction should be carried out under superatmospheric pressure sufficient to raise the boiling point to the desired degree. When the boiling point of the reaction mass is above about 100° C., the reaction is generally effected at atmospheric pressure; but superatmospheric pressures can be employed as desired or as may be required in order to attain a sufficiently high reaction temperature. Reaction temperatures ranging, for instance, between about 100° C. and about 300° C., more particularly from about 125° C. to about 275° C., are generally satisfactory.

If desired, a catalyst and/or activator and/or promoter may be added to the reaction mass to shorten the induction period or otherwise to facilitate the reaction. A small amount of iodine, e. g., in crystalline form, is a suitable additive, more particularly an activator. Other examples are methyl iodide and an ether solution of methyl magnesium iodide. Additional examples are given in the aforementioned Kharasch et al. publication (see page 1363 of the General Index under "Activation of Magnesium"). The amount of activator or other additive to facilitate the reaction, if used, may be varied as described or as conditions may require, for instance from 0.00001% to 0.1% or more by weight of the hydrocarbon-halide reactant.

The period of reaction will vary considerably and will depend upon such influencing factors as, for instance, the particular starting reactants employed, the particular reaction products wanted, the temperature at which the reaction is effected, the kind of activator or other additive (if any) that is employed to facilitate the reaction, the size, type and kind of reaction apparatus employed and other influencing factors. Thus, the period of reaction may range from ½ to 48 hours or more.

The processing steps subsequent to the termination of the reaction between the primary reactants will vary considerably, and the particular procedure employed is largely influenced by the particular starting reactants used and the particular product or products wanted. As illustrative of the various techniques that can be used, the following is mentioned.

A solvent such, for example, as diethyl ether, di-n-propyl ether, di-n-butyl ether, the various diamyl ethers including di-n-amyl ether, "diglyme" (the dimethyl ether of diethylene glycol), dioxane, anisole, chlorobenzene, benzene, toluene, phenetole, n-hexane, petroleum ether, and tertiary amines (e. g., triethylamine, dimethylaniline, pyridine, N-alkyl morpholines) can be added at the end of the initial reaction period and the precipitated magnesium salts (e. g., Mg(OR)X, MgX$_2$, Mg(OR)$_2$) filtered off prior to distilling the filtrate to remove unreacted boron-ester starting reactant and, if distillable without decomposition, also the boron ester and borine products of the reaction [for example, R'B(OR)$_2$, and R'R"B(OR) and R'R"R"'B]. In cases where the reaction products undergo decomposition at the distillation temperatures, other means can be employed for isolating the products (e. g., recrystallization from a suitable solvent or a mixture of solvents).

One also can isolate the boron-ester reaction products [R'B(OR)$_2$, R'R"B(OR)] and, under certain conditions, the borine, R′R″R‴B, by titrating the reaction mass with a saturated aqueous solution of an ammonium salt, e. g., ammonium chloride, ammonium sulfate, etc., in order to decompose any unreacted Grignard reagent that may have been formed in the course of the reaction, e. g., R′MgX, and to decompose the complexes formed between the boron esters and the magnesium salts liberated in the reaction. The precipitated magnesium salts can then be filtered off and the filtrate subjected to a fractional distillation in order to separate unreacted borate, i. e., starting material, B(OR)₃, the boronate, R′B(OR)₂, the borinate, R′R″B(OR) and the borine, R′R″R‴B.

Another means of isolating the boron-ester reaction products and the borine comprises adding to the reaction mass a suitable active hydrogen-containing compound, e. g., an alcohol, a primary amine, a secondary amine, a compound containing both primary and secondary amino groups, an alkanolamine, glacial acetic acid, or the like. The solid that precipitates is filtered off, washed with a suitable anhydrous solvent, and the combined filtrate and washings distilled to remove unreacted borate ester and any solvent, and also the reaction products.

The hydrolysis products, mainly the boronic and borinic acids, are produced by hydrolyzing, preferably under aqueous acidic conditions, the isolated (if this has been done) B-hydrocarbon-substituted boron-ester reaction product; or by hydrolyzing, also preferably under aqueous acidic conditions, the reaction mass containing the unisolated reaction products. In either case hydrolysis can be effected at temperatures ranging, for example, from —50° C. to 100° C. Hydrolysis is preferably effected at a temperature sufficiently high to maintain the boron-ester reaction product, or reaction mass containing the same, in liquid state.

Any acid can be used to provide the acidic conditions for hydrolysis, in an aqueous medium, of the isolated boron-ester reaction product. To provide the acidic conditions for hydrolysis, in an aqueous medium, of the reaction mass containing magnesium salts, any acid that will cause the magnesium salts to dissolve can be used. A mineral acid (or its obvious equivalent) can be employed, e. g., hydrochloric, hydrobromic, sulfuric, phosphoric, dichloroacetic, trichloroacetic, etc. A weak acid or an acidic or potentially acidic body can also be used to provide the acidic conditions, e. g., ammonium chloride, ammonium sulfate, acetic acid.

Since the borinic acids, R′R″BOH, are not isolable in a pure state, they can be converted to readily isolable derivatives (e. g., the anhydride, the monoethanolamine ester, etc.) which, if desired, can then be readily converted to the borinic acid.

The borines, R′R″R‴B, can be isolated in, for example, the following manner: The reaction mass, after being freed of the magnesium salts as described above, can be subjected to distillation carried out in such a manner as to allow the separation of the borine from the boronate and borinate esters.

In order that those skilled in the art may better understand how the present invention can be carried into effect, the following examples are given by way of illustration and not by way of limitation. All parts and percentages are by weight unless otherwise stated.

*Example 1*

The following equations illustrate the reactions involved in this example:

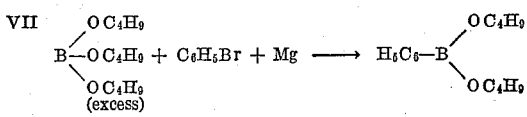

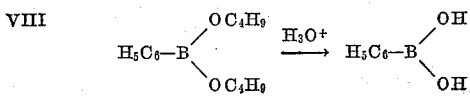

Twenty-five (25) ml. of tributyl borate, i. e., tri-n-butyl borate (of a total of 1085 ml.; 920 g., 4 moles), is added to a reaction vessel provided with a stirrer and two dropping funnels, to which vessel previously has been added 24.32 g. (1 g. atom) of magnesium turnings. The magnesium is pretreated by etching with 10 percent aqueous hydrochloric acid, followed by successive washings with water, ethanol, acetone and ether, after which it is dried at 105° C. A small amount of bromobenzene (of a total of 157 g., 1 mole) is then added to the reaction mass, together with a crystal of iodine to initiate the reaction. The reaction mass is heated to reflux without stirring. When the purplish iodine color has disappeared at 120° C., indicating that the reaction has begun, stirring is started. The remaining tributyl borate (1060 ml.) is then added concurrently with the addition of the remaining bromobenzene from the second dropping funnel. Thirty minutes after completing these additions a gummy solid separates on the sides of the vessel and the solution becomes yellow. As refluxing continues the solution becomes more viscous and the color intensifies. After maintaining the reaction temperature for several hours at about 228° C., which is the boiling point of tributyl borate, heating and stirring are discontinued.

The reaction mass, at the end of the reaction period, is a viscous liquid while hot but solid at room temperature. It is hydrolyzed by pouring the hot liquid or pourable mass over crushed ice or into water at room temperature (20°–30° C.), followed by acidification of the reaction mass with, for example, concentrated HCl. Thereafter, the organic phase is separated and extracted with three 400-ml. portions of dilute aqueous sodium hydroxide. Upon acidification of this basic solution, for instance until acid to pH paper (i. e., a pH of 1 to 2), using concentrated HCl or other strong acid for this purpose, phenylboronic acid crystallizes from the solution. After filtration, the mother liquor is concentrated to yield more product. The total yield is 80.2 g. (66 percent of theoretical) of phenylboronic acid.

*Example 2*

Exactly the same procedure is followed as described under Example 1 down to the hydrolysis step. The solid reaction mass is pulverized in a dry nitrogen atmosphere, and about 1500 cc. of anhydrous diethyl ether is added. Upon addition of a saturated aqueous solution of ammonium chloride, the ether becomes cloudy; and upon further addition solid material begins to separate from solution. The saturated ammonium chloride solution is added to the point at which the ether solution becomes clear. The ether solution is then decanted from the precipitated magnesium salts and distilled. After removing solvent and butanol, the desired ester (di-n-butyl phenylboronate) is obtained in a high yield by distillation at reduced pressure.

The use of a saturated aqueous solution of an acidic ammonium salt of an acid having a pH value of less than 4.75, e. g., ammonium chloride, to decompose the complex obtained as an intermediate product of the reaction is not my invention, this improvement being broadly and specifically claimed in the copending application of Stanley F. Stafiej, Serial No. 680,388, filed concurrently herewith.

*Example 3*

The same general procedure is followed as described under Example 1, but using 12.2 g. (0.5 g. atom) magnesium, 470 g. (2.5 moles) tri-n-propyl borate and 46.3 g. (0.5 mole) n-butyl chloride. After the addition of the chloride has been completed, the reaction mixture is maintained at reflux temperature for about 20 hours. Isolation of the product as described under Example 1 gives n-butylboronic acid; M. P. 75°–94° C.

*Example 4*

Grignard grade magnesium turnings (2.5 g., 0.103 g. atom), 146 g. (1 mole) triethyl borate and a crystal of iodine are placed in a 200 ml. capacity rocking-type autoclave fitted with a flexible inlet tube through which a liquid can be introduced under pressure. While the reaction mixture is agitated, the temperature is raised to 120° C. and 32.6 g. (0.11 mole) n-dodecyl iodide is introduced in portions. An indication of reaction taking place is a rise in temperature and pressure in the autoclave during the course of the addition. After addition is complete, the reaction mixture is heated to 200°–250° C. and maintained in this temperature range for a period of about six hours. At the end of the reaction period, the autoclave is allowed to cool to room temperature and opened cautiously by means of a valve to release any pressure that may remain. The autoclave is opened and the wet solid treated with 10% aqueous sulfuric acid with cooling and stirring until the reaction mass is acid to pH paper. The reaction mass is then extracted with several portions of ether. The combined ether solutions are extracted with 5% aqueous NaOH solution, the aqueous layer acidified (to pH paper) with 10% aqueous sulfuric acid and then extracted with three portions of ether. The wet, ether layer is evaporated on the water bath under a stream of nitrogen to leave an oil which, on standing, turns to a light, yellow-colored waxy solid comprised of n-dodecylboronic acid.

*Example 5*

Trimethyl borate (52 g., 0.5 mole), 1.22 g. (0.05 g. atom) magnesium turnings and a crystal of iodine are placed in a 100 ml. stainless steel autoclave which is part of a rocking-type pressure apparatus. The autoclave is heated to about 120° C. under autogenous pressure and 7.9 g. (0.05 mole) bromobenzene introduced under nitrogen pressure in portions over a 30-minute period. At the end of the addition, the temperature is raised to about 225° C. and maintained at this temperature, with agitation, for a period of about 10 hours. The reaction mass is then worked up in the manner described in Example 4 to give pure phenylboronic acid after recrystallization from hot water.

*Example 6* n-Octyl bromide (19.3 g., 0.1 mode), 2.4 g. (0.1 g. atom) magnesium turnings and 92.0 g. (0.4 mole) tri-n-butyl borate are reacted together in the manner described in Example 1. At the end of the reflux period, the reaction mass is cooled and transferred in the form of a wet solid to a vessel containing enough ether to provide an easily stirred suspension. Saturated aqueous ammonium chloride is then added portionwise with rapid stirring to the point at which the solids separate quickly and leave a clear, supernatant liquid when stirring is stopped momentarily. The solution is decanted and filtered through anhydrous $Na_2SO_4$. The filtrate is then subjected to a fractional distillation to obtain the product, dimethyl(n-octyl)boronate, which also may be named as the dimethyl ester of n-octylboronic acid.

*Example 7*

Cyclohexyl bromide (81.5 g., 0.5 mole), 4.9 g. (0.2 g. atom) magnesium turnings and 345 g. (1.5 moles) n-butyl borate are reacted together in the manner described under Example 1 with a 24-hour reflux period. The reaction mass is worked up in the manner described in Example 6 to yield n-butyl(dicyclohexyl)borinate and some di-n-butyl(cyclohexyl)boronate.

*Example 8*

The preparation of di-n-amyl(allyl)boronate (di-n-amyl ester of allylboronicacid) is carried out in the manner described under Example 1 by reacting 12.1 g. (0.1 mole) allyl bromide with 2.43 g. (0.1 g. atom) magnesium and 272 g. (1 mole) tri-n-amyl borate. A polymerization inhibitor can be added during the isolation steps.

*Example 9* p-Bromotoluene (171 g., 1 mole) is added to 48.6 g. (2 g. atoms) magnesium turnings, 230 g. (1 mole) tri-butyl borate and a small crystal of iodine over a period of 15 minutes at a temperature of 135° C. The reaction mixture is refluxed for about 10 hours. The reaction mass is then cooled and hydrolyzed to an acid pH with 10% aqueous hydrochloric acid. The reaction mass is extracted with ether, and the ether layer washed with two portions of 5% aqueous NaOH solution. After separating the organic layer and washing with water, the ether is removed by distillation under a nitrogen atmosphere. The residue is then fractionally distilled under nitrogen to give a fraction comprising tritolylborine.

*Example 10*

Magnesium turnings (2.43 g., 0.1 g. atom), 104 g. (1 mole) trimethyl borate and a crystal of iodine are placed in an autoclave. Benzyl bromide (17.1 g., 0.1 mole) is added under pressure at 120° C. and the reaction conducted in the manner described in Example 4. The reaction mass is then worked up as described in Example 1 to yield benzylboronic acid, M. P. 195°–215° C.

*Example 11* n-Butyl bromide, di-n-butyl(phenyl)boronate and magnesium metal are reacted in the mole ratios of 1:5:1 (1 mole of Mg=1 g. atom) in the manner described in Example 1 to yield crude phenyl(n-butyl)borinic acid, a light yellow oil. Distillation in vacuo of this oil yields the anhydride IX 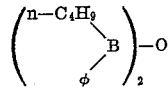

(The symbol "$\phi$" represents the phenyl radical, $C_6H_5$—.) The oil can be treated with an aqueous ethanolic solution of ethanolamine which results in the separation of the crystalline aminoethyl[phenyl(n-butyl)]borinate, X 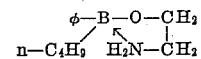

*Example 12*

When n-butyl bromide, magnesium and tri-n-butyl borate are reacted together in the mole ratios 1:1:2 in the manner described in Example 7, n-butyl(dibutyl)borinate is isolated in addition to some di-n-butyl(butyl)boronate.

*Example 13*

Bromobenzene (157 g., 1 mole), 30.4 g. (1.25 g. atoms) magnesium turnings and 230 g. (1 mole) tri-n-butyl borate are allowed to react in the manner described in Example 6 to yield, after fractional distillation, n-butyl(diphenyl)borinate. 23.8 g. (0.1 mole) n-butyl(diphenyl)-borinate obtained in this manner or by methods reported in the literature is reacted with 2.4 g. (0.1 g. atom) magnesium and 15.7 g. (0.1 mole) bromobenzene at 220°–250° C. for a period of about 20 hours. The reaction mass is cooled and hydrolyzed by adding it to cold 10% aqueous sulfuric acid. An ether extract of this solution is in turn extracted with three portions of 5% aqueous NaOH, washed with waer, dried over anhydrous $Na_2SO_4$ and distilled, first at atmospheric pressure and then in vacuo. It is important to exclude oxygen during these operations and all manipulations are conducted in a nitrogen atmosphere. The fraction boiling at 203° C./15 mm. is triphenyl boron (triphenyl borine), M. P. 137° C.

*Example 14*

Tri-n-butyl borate (1 mole), n-hexyl bromide (2.5 moles) and magnesium (4 g. atoms) are reacted together under the conditions given in Example 13. The reaction product is hydrolyzed with 10% aqueous sulfuric acid and extracted with ether. The ether solution contains a mixture of n-hexylboronic acid, di-n-hexylborinic acid and tri-n-hexyl boron (tri-n-hexyl borine). Extraction with 5% aqueous NaOH leaves the tri-n-hexyl boron in ether solution, and from which it can be isolated by distillation; B. P. 97° C./0.002 mm.

The basic solution of the boronic and borinic acids is acidified with aqueous hydrochloric acid and extracted with ether. The ether is removed on a water bath and the residue taken up in aqueous ethanol. Addition of monoethanolamine causes the borinic acid to crystallize as the aminoethyl(di-n-hexyl)borinate.

The solution containing the boronic acid is evaporated on a steam bath to dryness, extracted with ether, the ether solution evaporated and the residue recrystallized from hot water to yield n-hexylboronic acid. Recrystallization from methylene chloride affords a product, M. P. 70° C. Recrystallization from water raises the M. P. to 88°–90° C. In all of the operations described above, oxygen is excluded by working in a nitrogen atmosphere.

I claim:
1. The method which comprises reacting together, while in intimate contact with metallic magnesium, (1) a halide represented by the general formula (a) R'''X wherein R''' has the meaning hereinafter given, and X represents a halogen selected from the class consisting of chlorine, bromine and iodine, and (2) an ester of an oxy acid of boron selected from the class consisting of those represented by the general formulas

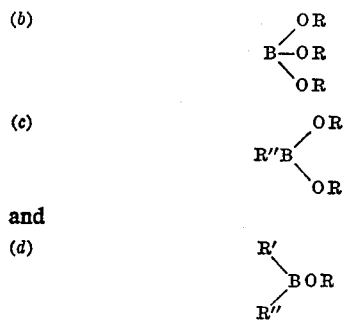

and (d)

wherein R''' in formula (a), and R, R' and R'' where they appear in formulas (b), (c) and (d) represent a hydrocarbon radical wherein any unsaturation between adjacent carbon atoms is a double bond, said reaction being effected under anhydrous conditions and at a temperature of from about 100° C. up to a temperature corresponding to the reflux temperature of the reaction mass.

2. A method as in claim 1 wherein the ester of the oxy acid of boron is a triester of boric acid, said triester being represented by the formula $$B{-}OR \atop OR}^{OR}$$

wherein each R represents a hydrocarbon radical wherein any unsaturation between adjacent carbon atoms is a double bond.

3. A method as in claim 2 wherein the triester of boric acid is tributyl borate.

4. A method as in claim 1 wherein the ester of the oxy acid of boron is a diester of a boronic acid, said diester being represented by the formula

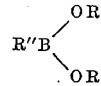

wherein R'' and each R represents a hydrocarbon radical wherein any unsaturation between adjacent carbon atoms is a double bond.

5. A method as in claim 1 wherein the ester of the oxy acid of boron is a monoester of a borinic acid, said monoester being represented by the formula

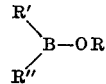

wherein R, R' and R'' each represents a hydrocarbon radical wherein any unsaturation between adjacent carbon atoms is a double bond.

6. A method as in claim 1 wherein X represents bromine.

7. A method as in claim 1 wherein the halide is bromobenzene.

8. A method as in claim 1 which includes the additional steps of hydrolyzing, under acidic conditions, the ester product obtained from the first reaction; and isolating the hydrolyzed product.

9. The method of preparing phenylboronic acid which comprises reacting, under anhydrous conditions and at a temperature of from about 100° C. up to a temperature corresponding to the reflux temperature of the reaction mass, bromobenzene and a molecular excess, with respect to the said bromobenzene, of a trialkyl borate while the said reactants are in intimate contact with magnesium; hydrolyzing the resulting dialkyl ester of phenylboronic acid to phenylboronic acid; and isolating phenylboronic acid from the resulting reaction mass.

10. A method as in claim 9 wherein the trialkyl borate is tributyl borate and the reaction is effected at a temperature ranging from about 120° C. up to the reflux temperature of the reaction mass.

References Cited in the file of this patent

Kharasch et al.: Grignard Reactions of Non-Metallic Substances, Prentice-Hall, Inc., New York, N. Y., 1954, pp. 3, 1013–1015, 1335, 1336.

UNITED STATES PATENT OFFICE
CERTIFICATE OF CORRECTION

Patent No. 2,862,952                      December 2, 1958

Stephen J. Groszos

It is hereby certified that error appears in the printed specification of the above numbered patent requiring correction and that the said Letters Patent should read as corrected below.

Column 2, lines 63 and 66, for "boronic", each occurrence, read -- borinic --; column 4, line 37, for "described" read -- desired --; column 7, line 43, for "(19.3 g., 0.1 mode) read -- (19.3 g., 0.1 mole) --; line 71, for "allylboronicacid" read -- allylboronic acid --; column 8, line 63, for "waer" read -- water --.

Signed and sealed this 10th day of March 1959.

(SEAL)
Attest:

KARL H. AXLINE
Attesting Officer

ROBERT C. WATSON
Commissioner of Patents